United States Patent
Imaki et al.

(10) Patent No.: US 12,147,406 B2
(45) Date of Patent: Nov. 19, 2024

(54) DATABASE MANAGEMENT APPARATUS AND DATABASE MANAGEMENT METHOD

(71) Applicant: Hitachi, Ltd., Tokyo (JP)

(72) Inventors: Tsuneyuki Imaki, Tokyo (JP); Masayuki Sakata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 46 days.

(21) Appl. No.: 18/114,521

(22) Filed: Feb. 27, 2023

(65) Prior Publication Data

US 2024/0020286 A1   Jan. 18, 2024

(30) Foreign Application Priority Data

Jul. 15, 2022   (JP) .................. 2022-113783

(51) Int. Cl.
  *G06F 16/22*   (2019.01)
(52) U.S. Cl.
  CPC .................. *G06F 16/221* (2019.01)
(58) Field of Classification Search
  CPC .................................................. G06F 16/221
  See application file for complete search history.

(56) References Cited

U.S. PATENT DOCUMENTS

| | | | |
|---|---|---|---|
| 7,720,824 B2 * | 5/2010 | Barsness | G06F 16/2365 707/700 |
| 2016/0171235 A1 | 6/2016 | Konik et al. | |
| 2018/0053096 A1 * | 2/2018 | Farrell | G06F 16/9024 |
| 2018/0232528 A1 * | 8/2018 | Williamson | G06N 5/025 |
| 2019/0155794 A1 | 5/2019 | Mujumdar et al. | |
| 2020/0026790 A1 | 1/2020 | Maclean et al. | |
| 2020/0073989 A1 * | 3/2020 | Valentin | G06F 16/248 |
| 2020/0104379 A1 * | 4/2020 | Wada | G06F 16/221 |
| 2022/0222233 A1 * | 7/2022 | Enuka | G06F 16/285 |
| 2022/0277004 A1 * | 9/2022 | Griffith | G06F 16/2471 |
| 2023/0113635 A1 * | 4/2023 | Borhade | G06F 16/215 707/692 |

* cited by examiner

*Primary Examiner* — Huawen A Peng

(74) *Attorney, Agent, or Firm* — MATTINGLY & MALUR, PC

(57) ABSTRACT

A database management apparatus receives the specification of an origin column, calculates a confidentiality level of a column in a different database from the database related to the origin column based on a confidentiality level of the origin column and a degree of similarity between contents of data in the origin column and contents of data in the column in the different database. A confidentiality level of the different database is calculated based on the calculated confidentiality level and a value indicating identifiability of the data in the column in the different database, and a confidentiality level of a column selected in the different database is calculated based on the confidentiality level of the different database and a value indicating identifiability of data in the selected column. The selected column is set as the new origin column, and the calculated confidentiality level is set as its confidentiality level.

9 Claims, 7 Drawing Sheets

CALCULATION METHOD DATA 200

CONFIDENTIALITY LEVEL OF COLUMN
   ← CONFIDENTIALITY LEVEL OF ORIGIN COLUMN
   ← (CONFIDENTIALITY LEVEL OF ORIGIN COLUMN>THRESHOLD)? 100 : 0
   :
                                                        201

CONFIDENTIALITY LEVEL OF TABLE
   ← CONFIDENTIALITY LEVEL OF COLUMN × RELIABILITY OF METADATA
   ← (CONFIDENTIALITY LEVEL OF COLUMN>THRESHOLD)? RELIABILITY OF METADATA : 0
   :
                                                       202

CONFIDENTIALITY LEVEL OF COLUMN
   ← CONFIDENTIALITY LEVEL OF TABLE × RELIABILITY OF COLUMN
   ← (CONFIDENTIALITY LEVEL OF TABLE>THRESHOLD)? RELIABILITY OF COLUMN : 0
   :
                                                      203

FIG. 2

DATABASE MANAGEMENT APPARATUS AND DATABASE MANAGEMENT METHOD

CROSS-REFERENCE TO RELATED APPLICATION

This application claims priority pursuant to Japanese patent application No. 2022-113783, filed on Jul. 15, 2022, the entire disclosure of which is incorporated herein by reference.

BACKGROUND

Technical Field

The present disclosure relates to a database management apparatus and a database management method.

Related Art

Operation management of a large amount of data has become necessary due to development of artificial intelligence and machine learning (AI/ML). Such data also include many pieces of data with high confidentiality. However, the level of confidentiality required for these pieces of data is not always constant, and has a possibility of always changing due to changes in social situation, requests for legal compliance, changes in business methods, and the like. Accordingly, it is necessary to change the setting of the confidentiality level (access restriction) of the database storing these pieces of data to allow only specific users to access information with a high confidentiality level.

However, databases that include data to be subjected to the confidentiality level change are normally present in large numbers, and pieces of data are complexly associated with one another among the databases. Accordingly, when setting of confidentiality of one piece of data is to be changed, setting of confidentiality of the other pieces of data and the databases that is linked with the confidentiality of the one piece of data also needs to be changed. Many of such works currently relies on manual labor. Accordingly, techniques for automation of such processes are proposed.

US Patent Application Publication No. 2019/0155794 describes a technique as follows. In an object database in which data having a compound structure is managed by using multiple tables and columns, metadata for access control is determined based on the structure of the data. When a query is issued, access control is implemented by referring to the metadata and, if necessary, rewriting the query.

US Patent Application Publication No. 2016/0171235 describes a technique as follows. When a query is issued for a secure table defined by a user, a score (degree of compliance to security defined by the user) of the query is calculated based on a result of the query, and whether or not to allow access is determined by comparing the calculated score with a threshold.

US Patent Application Publication No. 2020/0026790 describes a technique as follows. A combination of multiple SQL queries is considered as a pipeline of data conversion and, in each SQL query, "derivation" relationships between columns are extracted based on conditions defined for the columns (for example, columns under a Join condition and conversion source and destination columns of Projection). A graph structure in which these relationships are expressed as edges is constructed to visualize the relationships.

SUMMARY

The technique of US Patent Application Publication No. 2019/0155794 performs the access control based on the data structure of each database, but access control based on actuality of data contents such as confidentiality and relationships between pieces of data are not sufficiently taken into consideration.

In US Patent Application Publication No. 2016/0171235, linkage of pieces of data between multiple databases is not sufficiently taken into consideration, and relationships of confidentiality levels between columns in the respective databases are difficult to determine.

In US Patent Application Publication No. 2020/0026790, although coupling relationships between columns are determined, coupling relationships based on data contents are not taken into consideration.

As described above, a technique that allows setting of appropriate access rights based on data contents of multiple databases in the case where the multiple databases are related to one another is not sufficiently developed.

The present disclosure has been made in view of the aforementioned circumstances, and an object thereof is to provide a database management apparatus and a database management method that enable easy setting of information for performing appropriate access control on each of pieces of data in multiple databases depending on the contents of the piece of data.

An aspect of the present disclosure to solve the above is a database management apparatus comprising: a storage device configured to store a plurality of databases each including one or more columns; and a processing device configured to receive specification of one of the columns in the databases as an origin column, calculate a confidentiality level of a column in a different database other than a database related to the specified origin column based on a confidentiality level of the origin column and a degree of similarity between contents of data stored in the specified origin column and contents of data stored in the column in the different database, calculate a confidentiality level of the different database based on the calculated confidentiality level and a value indicating identifiability of the data in the column in the different database, and calculate a confidentiality level of a column selected in the different database based on the calculated confidentiality level of the different database and a value indicating identifiability of data in the selected column, set the selected column as the new origin column, and set the calculated confidentiality level as a confidentiality level of the new origin column.

According to the present disclosure, it is possible to easily set information for performing appropriate access control of each of pieces of data in multiple databases depending on the contents of the piece of data.

Configurations, effects, and the like other than those described above will be apparent from description of an embodiment below.

BRIEF DESCRIPTION OF THE DRAWINGS

FIG. 2 is a diagram illustrating an example of calculation method data.

DETAILED DESCRIPTION OF THE INVENTION

An embodiment of the present disclosure is described below in detail with reference to the drawings.

Figure 1:
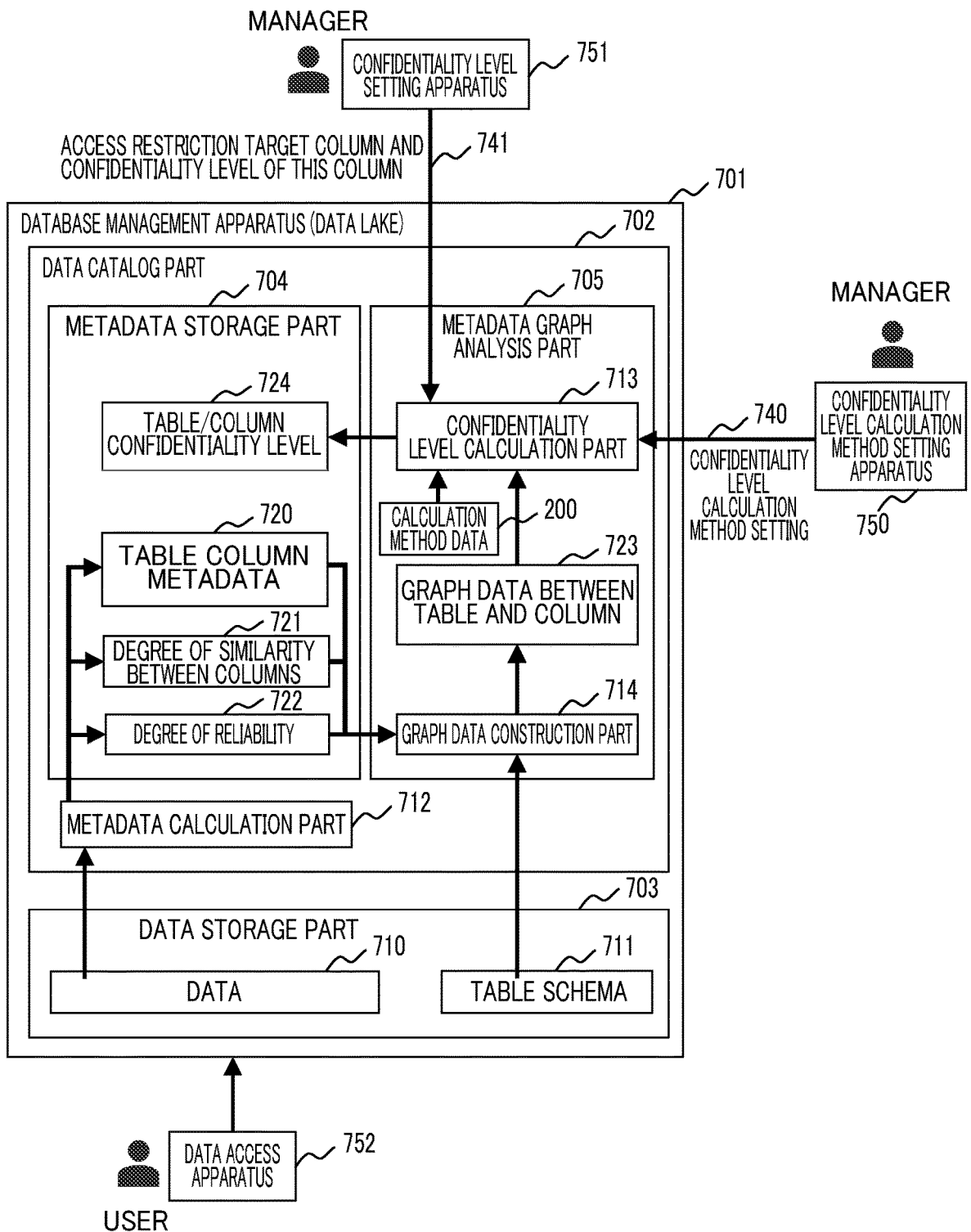
FIG. 1 is a diagram illustrating an example of a configuration of a database management system according to an embodiment of the present disclosure.

FIG. 1 is a diagram illustrating an example of a configuration of a database management system 1 according to an embodiment of the present disclosure. The database management system 1 is an information processing system configured to store multiple databases (hereinafter, also referred to as tables) that are formed of columns and records and that store secret data. Moreover, when a manager performs confidential setting on a specified column in a certain database among the stored databases, the database management system 1 performs appropriate level of confidential setting also on each of the columns in the databases including the certain database.

Specifically, the database management system 1 is configured to include information processing apparatuses of a data access apparatus 752, a confidentiality level setting apparatus 751, a confidentiality level calculation method setting apparatus 750, and a database management apparatus 701.

The data access apparatus 752, the confidentiality level setting apparatus 751, the confidentiality level calculation method setting apparatus 750, and the database management apparatus 701 are coupled to one another by a wired or wireless communication network such as, for example, the Internet, a local area network (LAN), a wide area network (WAN), or an exclusive line.

The confidentiality level setting apparatus 751 receives specification of a column (hereinafter, referred to as origin column) in a database for which initial setting of a confidentiality level is to be performed, from the manager, and transmits information on the specified origin column to the database management apparatus 701. The confidentiality level is a value indicating a degree of access restriction, and a user of the data access apparatus 752 to be described later is subjected to access restriction to contents depending on the value of the confidentiality level.

The confidentiality level calculation method setting apparatus 750 receives information (hereinafter, referred to as calculation method information) on a calculation method for the confidentiality level from the manager, and stores the inputted calculation method information in calculation method data 200 of the database management apparatus 701.

The database management apparatus 701 includes functional parts of a data storage part 703 and a data catalog part 702.

The data storage part 703 stores data 710 and a table schema 711 of each database. The table schema 711 is information defining a data structure of the database.

The data catalog part 702 includes a metadata calculation part 712, a metadata graph analysis part 705, and a metadata storage part 704.

The metadata calculation part 712 receives the data 710 of a database from the data storage part 703, and calculates parameters (described next) for the database or a column based on the received data. The metadata calculation part 712 stores the calculated parameters in a table column metadata 720, a degree of similarity between columns 721, and a degree of reliability 722 in the metadata storage part 704.

The table column metadata 720 in the metadata storage part 704 includes data on each table in the data storage part 703 and data on each table and each column used to calculate the degree of similarity and the degree of reliability to be described later.

The degree of similarity between columns 721 is data on the degree of similarity of data between columns (there are cases where the columns are columns in different tables and columns in the same table). Details of the degree of similarity are described later.

The degree of reliability 722 is a numerical data indicating identifiability (certainty of confidentiality) of data in each column. For example, when the number of types of value that data may take in a certain column is small or when variation of data is small (for example in the case of "male" or "female"), a subject (for example, individual person) of a record is difficult to determine from the data of this column, and the identifiability (certainty of confidentiality) is thus low.

Next, the metadata graph analysis part 705 includes a confidentiality level calculation part 713 and a graph data construction part 714.

The confidentiality level calculation part 713 calculates the confidentiality level of each column in each database according to the calculation method data 200, based on a confidentiality level parameter received from the confidentiality level calculation method setting apparatus 750, the origin column and the confidentiality level thereof received from the confidentiality level setting apparatus 751, information on the metadata storage part 704, and the like. The confidentiality level calculation part 713 stores the calculated confidentiality level in a table column confidentiality level 724 of the metadata storage part 704.

The graph data construction part 714 creates data (hereinafter, referred to as graph data) for creating a graph screen 300 to be described later based on the table column metadata 720 of the metadata storage part 704, the degree of similarity between columns 721, the degree of reliability 722, the confidentiality level 724, and the table schema 711 of the data storage part 703.

The data access apparatus 752 receives an access request for the specified column in the table from the user, and transmits the access request to the database management apparatus 701. The database management apparatus 701 transmits data (for example, whole or part of data specified in the access request or no data to be transmitted) of the column corresponding to the access request to the data access apparatus 752, according to the confidentiality level (confidentiality level calculated by the confidentiality level calculation part 713) of the column indicated by the access request. The data access apparatus 752 outputs the received data on a screen or the like.

(Calculation Method Data)

FIG. 2 is a diagram illustrating an example of the calculation method data 200. The calculation method data 200 includes a first method for calculating the confidentiality level of the column 201, a method for calculating the confidentiality level of the table 202, and a second method for calculating the confidentiality level of the column 203.

The first method for calculating the confidentiality level of the column 201 is a method for calculating the confidentiality level of a different column other than the origin column based on the confidentiality level of the origin column. For example, the confidentiality level of the different column is obtained from a product of the confidentiality level of the origin column and the degree of similarity. Alternatively, for example, the confidentiality level of the different column is set to 100 when the confidentiality level of the origin column is higher than a predetermined threshold, and is set to 0 when the confidentiality level of the origin column is equal to or lower than the predetermined threshold. Note that the former method is assumed to be selected according to an embodiment of the present disclosure.

The method for calculating the confidentiality level of the table 202 is a method for calculating the confidentiality level of the table based on the confidentiality level of the column. For example, the confidentiality level of the table is obtained from a product of the confidentiality level of the column and the degree of reliability of data in this column. Alternatively, for example, the confidentiality level of the table is set to a value of the degree of reliability of the data in the column when the confidentiality level of the column is higher than a predetermined threshold, and is set to 0 when the confidentiality level of the column is equal to or lower than the predetermined threshold. Note that the former method is assumed to be selected according to an embodiment of the present disclosure.

The second method for calculating the confidentiality level of the column 203 is a method for calculating the confidentiality level of one column based on the confidentiality level of a different column. For example, the confidentiality level of the one column is obtained from a product of the confidentiality level of the different column and the degree of reliability of the different column. Alternatively, for example, the confidentiality level of the one column is set to a value of the degree of reliability of the different column when the confidentiality level of the different column is higher than a predetermined threshold, and is set to 0 when the confidentiality level of the different column is equal to or lower than the predetermined threshold. Note that the former method is assumed to be selected according to an embodiment of the present disclosure.

The manager can freely set the methods for calculating the confidentiality levels as described above via the confidentiality level calculation method setting apparatus 750.

Note that the methods for calculating the confidentiality levels described herein are examples, and any other calculation methods may be used. For example, the column or the table to be the target of confidentiality level calculation may be specified or limited. When the confidentiality level of a certain column is to be calculated, the confidentiality level of a different column (for example, a column with similar items or contents) associated with the certain column may be used to calculate the confidentiality level.

Figure 3:
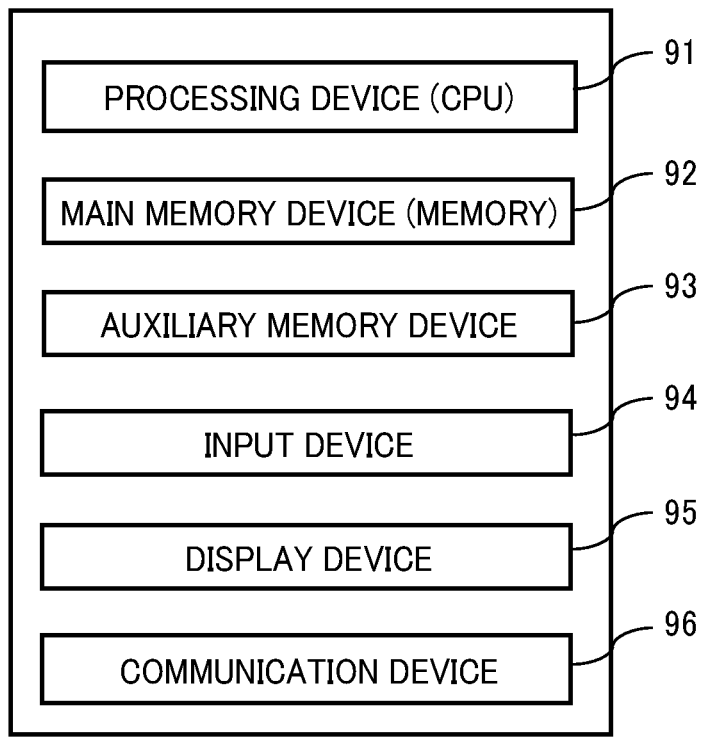
FIG. 3 is a diagram illustrating an example of hardware included in a database management apparatus.

Next, FIG. 3 is a diagram illustrating an example of hardware included in the database management apparatus 701. The database management apparatus 701 includes a processing device 91 such as a central processing unit (CPU), a main memory device 92 such as a random access memory (RAM) and a read only memory (ROM), an auxiliary memory device 93 such as a hard disk drive (HDD) or a solid state drive (SSD), a display device 95 such as a display or a touch panel, an input device 94 such as a keyboard, a mouse, or a touch panel, and a communication device 96 formed of a network interface card (NIC), a wireless communication module, a universal serial interface (USB) module, a serial communication module, or the like. Note that the confidentiality level calculation method setting apparatus 750, the data access apparatus 752, and the confidentiality level setting apparatus 751 also have similar hardware configurations.

Functions of the functional parts of the database management apparatus 701 described above are implemented by causing the processing device 91 to read predetermined programs that implement the functional parts from the main memory device 92 or the auxiliary memory device 93. Moreover, each program can be, for example, recorded in a portable or fixed recording medium and distributed. Note that these programs may be programs entirely or partially implemented by using virtual information processing resources provided by using a virtualization technology, a process space isolation technology, or the like as in, for example, a virtual server provided by a cloud system. Moreover, these programs may be entirely or partially implemented by services provided by, for example, a cloud system via an application programming interface (API) or the like.

Next, processes performed in the database management system 1 are described.

<Confidentiality Level Setting Process>

Figure 4:
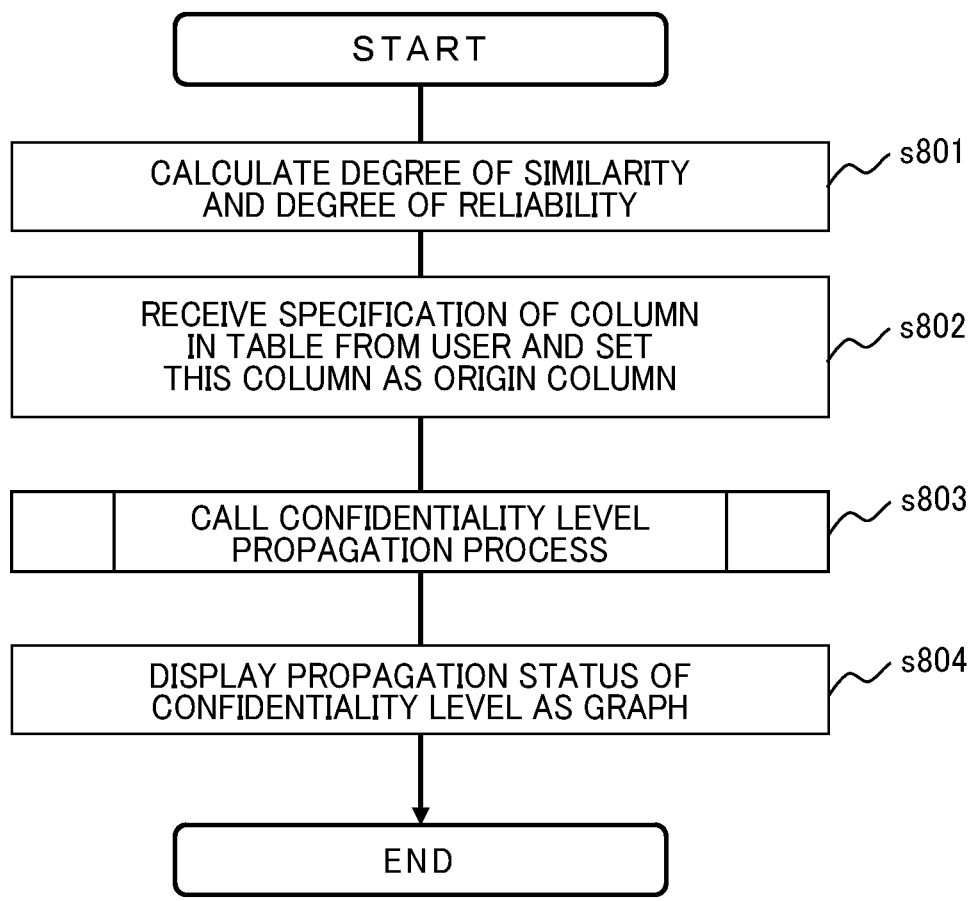
FIG. 4 is a flowchart explaining an example of a confidentiality level setting process.

FIG. 4 is a flowchart explaining an example of a confidentiality level setting process.

Figure 5:
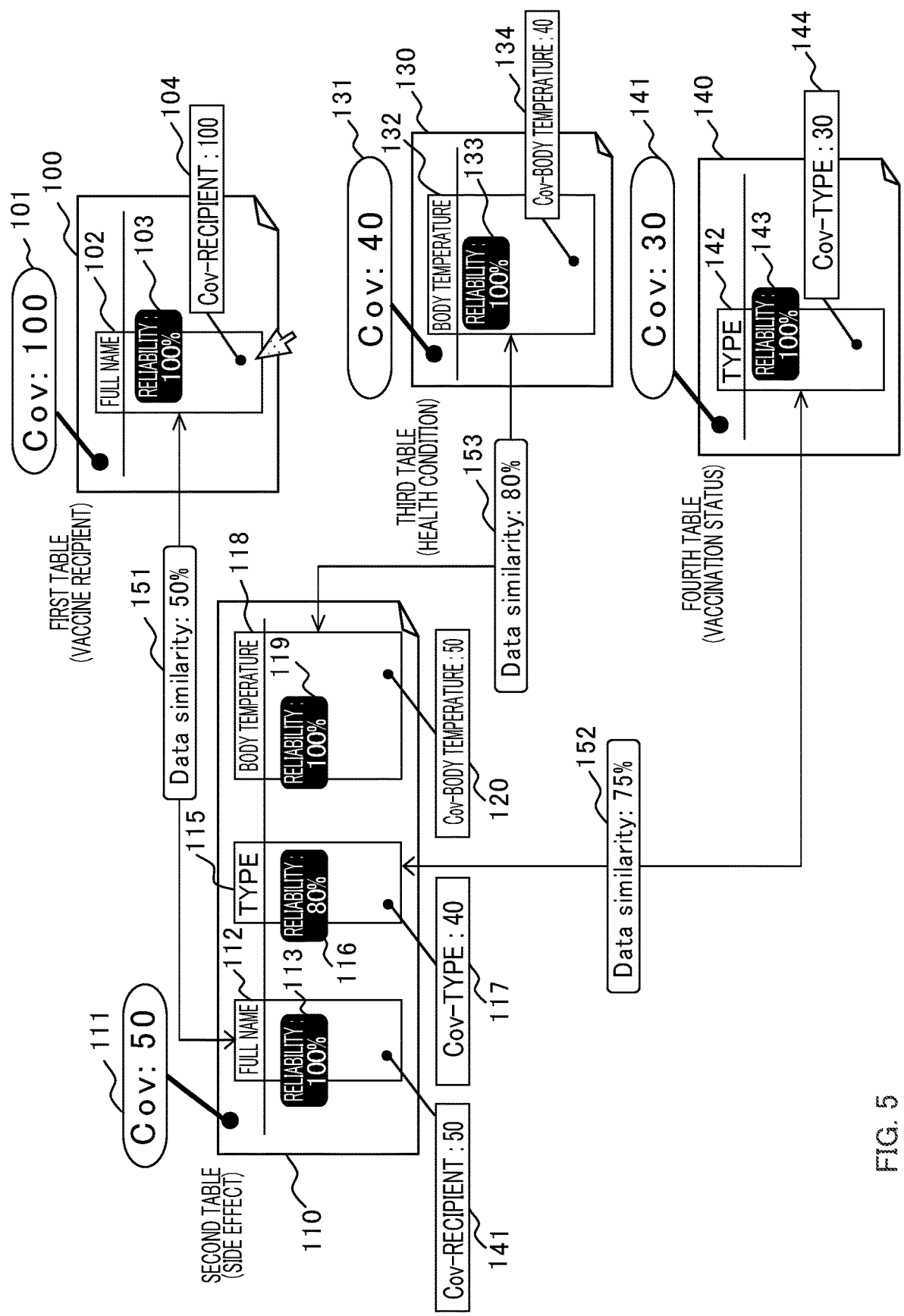
FIG. 5 is a diagram explaining an example of changes in a confidentiality level of each table and the like based on the confidentiality level setting process.

Moreover, FIG. 5 is a diagram explaining an example of changes in the confidentiality level of each table and the like based on the confidentiality level setting process.

The confidentiality level setting process is described below according to these drawings. Note that the confidentiality level setting process is triggered, for example, in the case where the database management apparatus 701 receives predetermined start information from the confidentiality level calculation method setting apparatus 750 or the confidentiality level setting apparatus 751.

First, as illustrated in FIG. 4, the metadata calculation part 712 reads the data 710 of each table in the data storage part 703 to calculate the degree of similarity between columns 721 and the degree of reliability 722 while causing the data 710 to be read into the table column metadata 720 (s801).

Regarding the degree of reliability 722, according to an embodiment of the present disclosure, the metadata calculation part 712 is assumed to calculate the degree of reliability for each column in each table by calculating a parameter value indicating variation of data such as variance or standard deviation of data values in the column. Note that the method of calculating the degree of reliability as described above is an example.

Moreover, regarding the degree of similarity between columns 721, according to an embodiment of the present disclosure, the metadata calculation part 712 is assumed to extract two columns from the columns of the tables and calculate the similarity of the distribution (probability distribution) of data contents (values) between the extracted two columns. Note that the method of calculating the degree of similarity as described above is an example. For example, the degree of similarity may be a degree of commonality (lineage. For example, the number of pieces of data with a common value between the two columns is used as the degree of commonality) of data values between the two columns, or a combination of the degree of commonality and the aforementioned degree of similarity.

Note that the metadata calculation part 712 may perform the process of s801 at a timing when the calculation of the degree of similarity or the degree of reliability becomes necessary in a confidentiality level propagation process s803 to be described later.

First, as illustrated in FIG. 4, the confidentiality level calculation part 713 receives specification of the origin column from the confidentiality level calculation method setting apparatus 750 (s802).

Specifically, the confidentiality level calculation part 713 receives information on the table and the column (that is, the origin column) inputted into the confidentiality level calculation method setting apparatus 750 by the manager, from the confidentiality level calculation method setting apparatus 750. Then, the confidentiality level calculation part 713 stores a value of the confidentiality level in association with the origin column. Note that the confidentiality level calculation part 713 may automatically set the value of the confidentiality level of the origin column (for example, 100) or may receive specification of the confidentiality level from the manager.

In the example of FIG. 5, the manager sets a Cov confidentiality level 101 with a name of "Cov" for a full name column 102 in a first table 100 (or may be set for the first table 100 itself) among the first table 100, a second table 110, a third table 130, and a fourth table 140, and sets the value of the Cov confidentiality level 101 to "100".

Next, the confidentiality level calculation part 713 invokes the confidentiality level propagation process s803. Details of the confidentiality level propagation process s803 are described later.

Thereafter, the graph data construction part 714 executes a graph display process s804 of displaying a status of propagation of confidentiality of each table and each column calculated in the confidentiality level propagation process s803. Details of the graph display process s804 are described later. The confidentiality level setting process is thereby completed.

<Confidentiality Level Propagation Process>

Figure 6:
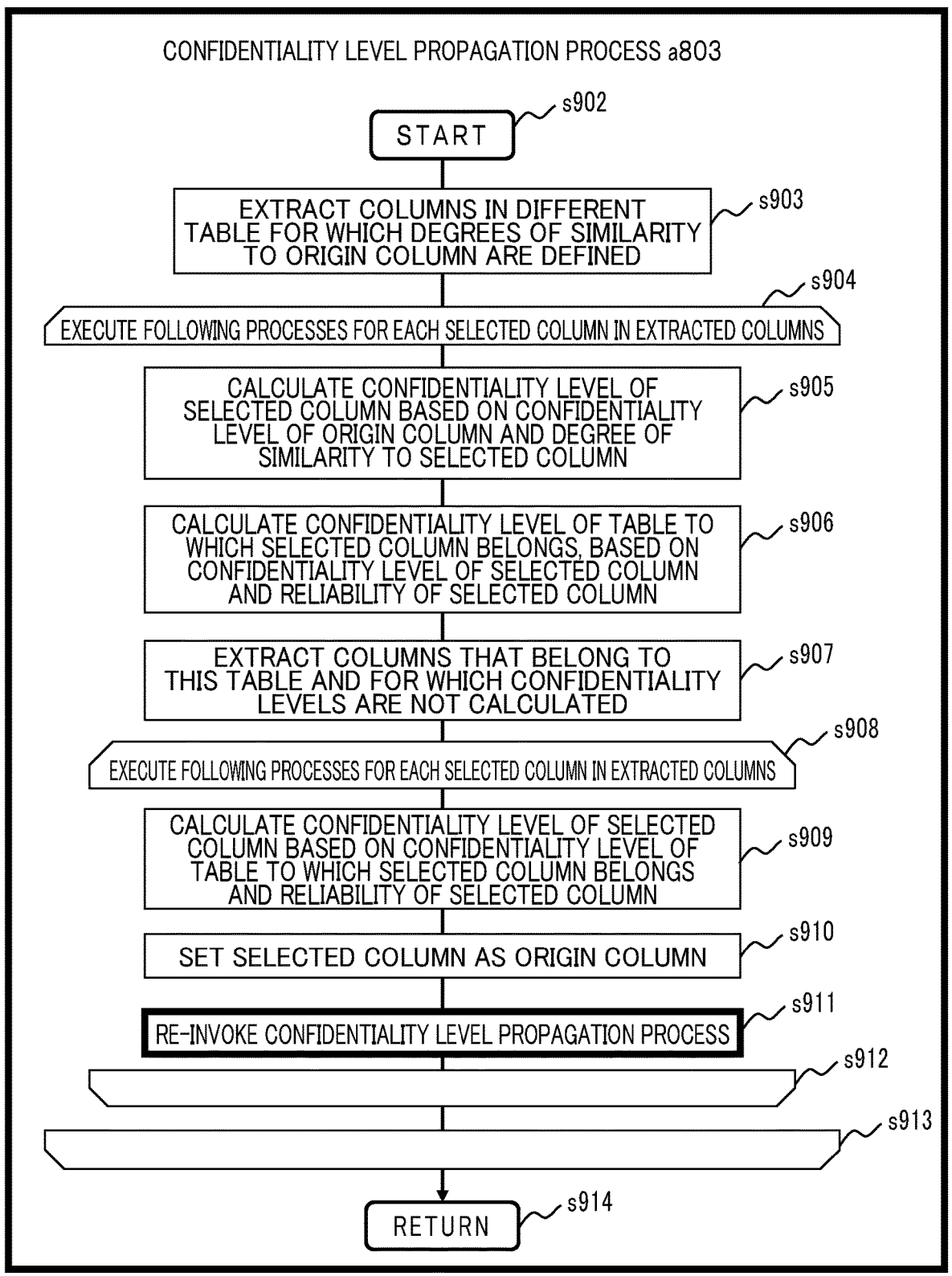
FIG. 6 is a flowchart explaining an example of a confidentiality level propagation process.

FIG. 6 is a flowchart explaining an example of the confidentiality level propagation process s803.

First, the metadata calculation part 712 identifies all columns in a different table other than the origin table (note that a different table that has not been selected yet) for which the degrees of similarity to the origin column are calculated (s903).

The metadata calculation part 712 selects one of the columns identified in S903 (s904). According to an embodiment of the present disclosure, the metadata calculation part 712 is assumed to select a column with the same name as the origin column (column directly associated with the origin column).

The metadata calculation part 712 determines the similarity between the column selected in s904 (hereinafter, referred to as selected column) and the origin column, and calculates the confidentiality level of the selected column based on the determined similarity and the confidentiality level of the origin column (s905).

Specifically, the metadata calculation part 712 calculates the confidentiality level of the selected column from the confidentiality level of the origin column by using the calculation method data 200.

In the example of FIG. 5, the metadata calculation part 712 multiplies "100" that is the Cov confidentiality level of the full name column 102 by a degree of similarity 151 "50%" between the full name column 102 and a full name column 112 in the second table 110 that is the selected column, according to the first method for calculating the confidentiality level of the column 201 in the calculation method data 200, and thereby calculates a Cov-recipient confidentiality level 114 "50" of the full name column 112 in the second table 110.

The metadata calculation part 712 calculates the confidentiality level of the table to which the selected column belongs, based on the confidentiality level of the selected column calculated in s905 and the reliability of the selected column (s906).

Specifically, the metadata calculation part 712 calculates the confidentiality level of the table to which the selected column belongs, from the confidentiality level of the selected column by using the calculation method data 200.

In the example of FIG. 5, the metadata calculation part 712 multiples the Cov-recipient confidentiality level 114 "50" of the full name column 112 in the second table 110 by a degree of reliability 113 of the full name column 112 according to the method for calculating the confidentiality level of the table 202 in the calculation method data 200, and thereby calculates a confidentiality level 111 "50" of the second table 110.

The metadata calculation part 712 identifies all columns for which the confidentiality levels are not calculated among the different columns in the table for which the confidentiality level is calculated in s906 (s907).

In the example of FIG. 5, the metadata calculation part 712 identifies a type column 115 and a body temperature column 118 in the second table 110.

The metadata calculation part 712 selects one of the columns identified in s907 (s908).

In the example of FIG. 5, the metadata calculation part 712 selects the type column 115 or the body temperature column 118 in the second table 110.

The metadata calculation part 712 calculates the confidentiality level of the column selected in s908 based on the confidentiality level of the table calculated in s906 and the reliability of the column selected in s908 (s910).

Specifically, the metadata calculation part 712 calculates the confidentiality level of the column selected in s908 from the confidentiality level of the table by using the calculation method data 200.

In the example of FIG. 5, the metadata calculation part 712 multiples the confidentiality level 111 "50" of the second table 110 by a degree of reliability 116 "80%" of the type column 115 (or a degree of reliability 119 "100%" of the body temperature column 118) according to the second method for calculating the confidentiality level of the column 203 in the calculation method data 200, and thereby calculates a Cov-type confidentiality level 117 "40" of the type column 115 (or a Cov-body temperature confidentiality level 120 "50" of the body temperature column 118).

The metadata calculation part 712 stores the column selected in s908 as a new origin column (s910), and invokes the confidentiality level propagation process s803 based on the stored origin column (re-invoking s911).

In the example of FIG. 5, the metadata calculation part 712 identifies all columns (for example, a type column 142) in the fourth table 140 with the type column 115 in the second table 110 being the origin column. Alternatively, the metadata calculation part 712 identifies all columns (for example, a body temperature column 132) in the third table 130 with the body temperature column 118 in the second table 110 being the origin column.

Note that, in the re-invoking s911, the metadata calculation part 712 calculates a Cov-type confidentiality level 144 of the type column 142 in the fourth table 140 based on a degree of similarity 152 with the type column 142 in the fourth table 140, and calculates a Cov confidentiality level 141 of the fourth table 140 based on a degree of reliability 143 of the type column 142. Alternatively, in the re-invoking s911, the metadata calculation part 712 calculates a Cov-body temperature confidentiality level 134 of the body temperature column 132 in the third table 130 based on a similarity 153 with the body temperature column 132 in the third table 130, and calculates a Cov confidentiality level 131 of the third table 130 based on a degree of reliability 133 of the body temperature column 132.

After returning from the re-invoking s911, the metadata calculation part 712 checks whether there is an unselected column among the columns identified in s907 (s912). When there is an unselected column, the metadata calculation part 712 executes the process of s908 to select the unselected column. When there is no unselected column, the metadata calculation part 712 executes a process of s913.

In s913, the metadata calculation part 712 checks whether there is an unselected column among the columns identified in s903. When there is an unselected column, the metadata calculation part 712 executes the process of s904 to select the unselected column. When there is no unselected column, the confidentiality level propagation process s803 is terminated.

The metadata calculation part 712 can set the confidentiality levels for all tables and columns in a chain reaction by performing the aforementioned process.

<Graph Display Process>

Figure 7:
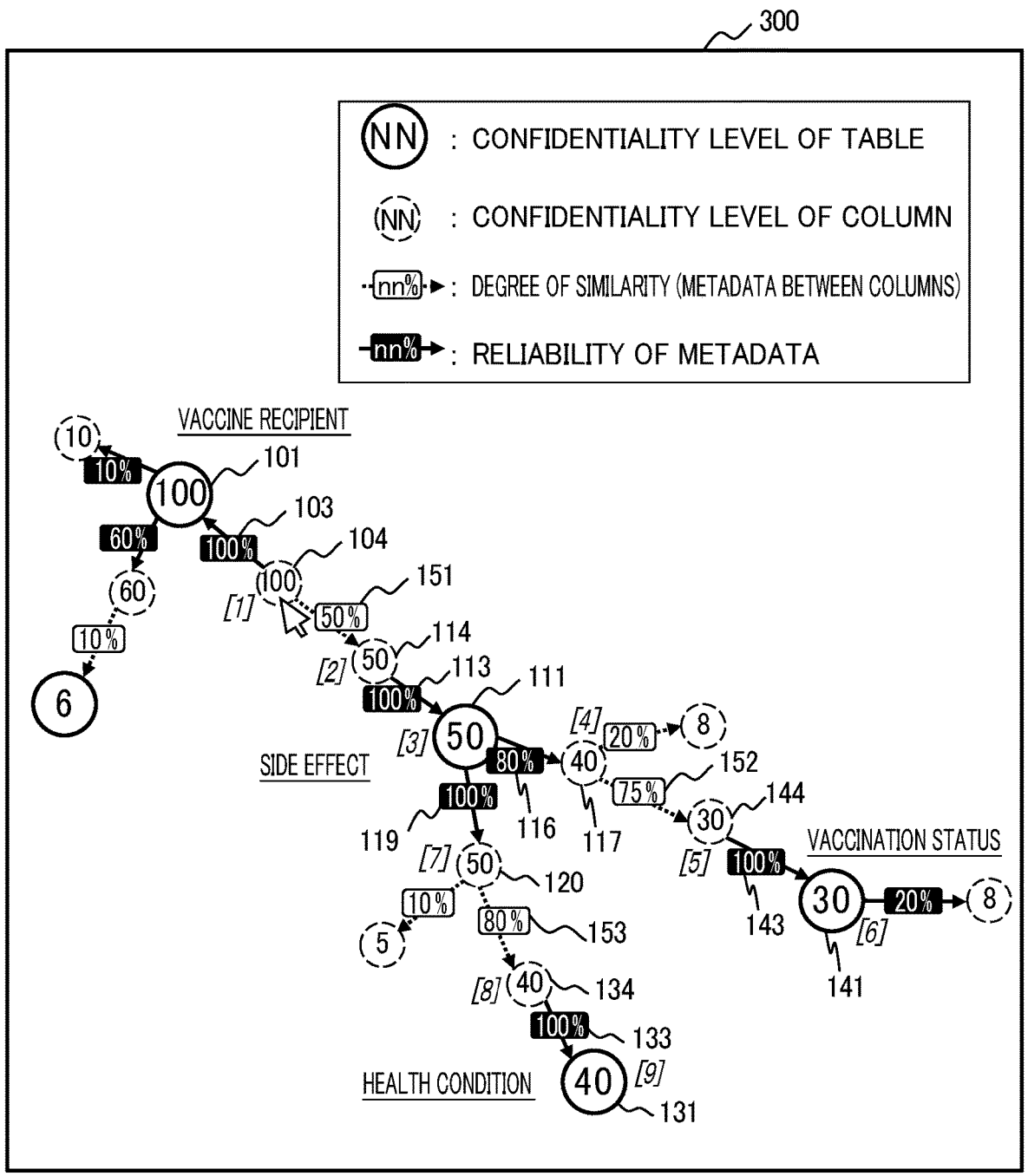
FIG. 7 is a diagram illustrating an example of a graph screen.

FIG. 7 is a diagram illustrating an example of the graph screen 300 displayed in the graph display process s804. As illustrated in FIG. 7, the graph in the graph screen 300 is a graph in which the tables and columns associated with confidentiality levels are expressed as nodes and the degrees of similarity or the degrees of reliability (for example, the degree of similarity between the table and the column, the degree of similarity between the columns, and the degree of reliability or the degree of similarity of the column or the table that is the basis of the calculation of the confidentiality level of the column or the table) are expressed as edges. In FIG. 7, the nodes are expressed by circles, and the edges are expressed by arrows each coupling two circles to each other. In each of the circles expressing the nodes, a value of the confidentiality level of the node is illustrated. Near each of the arrows expressing the edges, a value of the degree of reliability or the degree of similarity of the edge is illustrated. Note that types of figures (nodes are circles and edges are arrows) illustrated herein are examples, and may be changed to any other figures.

In the example of FIG. 7, a first circle expressing a Cov-recipient confidentiality level 104 of the full name column 102 (origin column) in the first table 100 (value of the confidentiality level is 100), a second circle expressing the Cov-recipient confidentiality level 114 of the full name column 112 in the second table 110 (value of the confidentiality level is 50), a third circle expressing a Cov confidentiality level 111 of the second table 110 (value of the confidentiality level is 50), a fourth circle expressing the Cov-type confidentiality level 117 of the type column 115 in the second table 110 (value of the confidentiality level is 40), a fifth circle expressing the Cov-type confidentiality level 144 of the type column 142 in the fourth table 140 (value of the confidentiality level is 30), and a sixth circle expressing the Cov confidentiality level 141 of the fourth table 140 (value of the confidentiality level is 30) are displayed in order. The first circle and the second circle are coupled to each other by an arrow expressing the degree of similarity 151 (value of the degree of similarity is 50%), the second circle and the third circle are coupled to each other by an arrow expressing the degree of reliability 113 (value of the degree of reliability is 100%), the third circle and the fourth circle are coupled to each other by an arrow expressing the degree of reliability 116 (value of the degree of reliability is 80%), the fourth circle and the fifth circle are coupled to each other by an arrow expressing the degree of similarity 152 (value of the degree of similarity is 75%), and the fifth circle and the sixth circle are coupled to each other by an arrow expressing the degree of reliability 143 (value of the degree of reliability is 100%).

From the third circle, a seventh circle expressing the Cov-body temperature confidentiality level 120 of the body temperature column 118 in the second table 110 (value of the confidentiality level is 50), an eighth circle expressing the Cov-body temperature confidentiality level 134 of the body temperature column 132 in the third table 130 (value of the confidentiality level is 40), and a ninth circle expressing the Cov confidentiality level 131 of the third table 130 (value of the confidentiality level is 40) are further displayed in order. The third circle and the seventh circle are coupled to each other by an arrow expressing the degree of reliability 119 (value of the degree of reliability is 100%), the seventh circle and the eighth circle are coupled to each other by an arrow expressing the degree of similarity 153 (value of the degree of similarity is 80%), and the eighth circle and the ninth circle are coupled to each other by an arrow expressing the degree of reliability 133 (value of the degree of reliability is 100%).

Note that only the information on the tables and columns whose confidentiality levels are equal to or higher than a predetermined value may be displayed on the graph screen 300.

The aforementioned graph screen 300 allows the manager or the like to check a process in which, with the origin set to the origin column for which the confidentiality level is initially set, the confidentiality level is propagated to the columns in the other tables.

As described above, the database management apparatus 701 according to an embodiment of the present disclosure calculates the confidentiality level of the column in the different database other than the database related to the origin column based on the confidentiality level of the origin column and the degree of similarity between the contents of data stored in the origin column in the database and the contents of data stored in the column in the different database, calculates the confidentiality level of the different database based on the calculated confidentiality level and the degree of reliability of the data in the column in the different database, calculates the confidentiality level of the column selected in the different database based on the calculated confidentiality level of the different database and the degree of reliability of the data in the selected column, sets the selected column as the new origin column, and sets the calculated confidentiality level as the confidentiality level of the new origin column.

Specifically, the database management apparatus 701 uses the initial confidentiality level of the origin column in the certain database as a basis to set the confidentiality level for the different database depending on the degree of similarity of the data contents and the degree of reliability, and sets the confidentiality level of the different column in the different database depending on the degree of reliability of the data. Then, the database management apparatus 701 repeats the aforementioned process of the origin column with the different column set as the new origin column.

Accordingly, the confidentiality level depending on the similarity of data and the identifiability is set for each of the columns in the related different databases only by determining the confidentiality level of the origin column in the beginning.

As described above, in the database management apparatus 701 according to an embodiment of the present disclosure, for each of pieces of data in multiple databases, information for performing appropriate access control depending on the contents of the data can be easily set.

Moreover, the database management apparatus 701 calculates the degree of similarity based on the degree of similarity between the distribution of the pieces of data stored in the origin column and the distribution of the pieces of data stored in the column in the different database.

The similarity between the columns can be thereby calculated by rational standards based on the data contents of the columns.

Furthermore, the database management apparatus 701 stores the calculation method for the confidentiality level of the column in the different database other than the database of the origin column, in the calculation method data 200, and calculates the confidentiality level of the column in the different database according to the stored calculation method.

Moreover, the database management apparatus 701 according to an embodiment of the present disclosure stores the calculation method for the confidentiality level of the different database other than the origin column, in the calculation method data 200, and calculates the confidentiality level of the different database according to the stored calculation method.

Furthermore, the database management apparatus 701 according to an embodiment of the present disclosure stores the calculation method for the confidentiality level of the selected column in the different database, in the calculation method data 200, and calculates the confidentiality level of the selected column according to the stored calculation method.

Storing the calculation methods of the respective confidentiality levels in advance and enabling calculation of the confidentiality levels based on these calculation methods allows the manager to set appropriate calculation methods for the confidentiality levels based on characteristics of the databases and the columns.

Moreover, the database management apparatus 701 according to an embodiment of the present disclosure outputs the graph in which the confidentiality level of the origin column, the confidentiality level of the column in the different database other than the table of the origin column, the confidentiality level of the different database, and the confidentiality level of the selected column in the different database are expressed respectively as nodes, the degree of similarity that is the calculation basis of the column in the different database, the degree of reliability that is the calculation basis of the confidentiality level of the different database, and the degree of reliability that is the calculation basis of the confidentiality level of the selected column in the different database are expressed respectively as edges, and the nodes are coupled to one another by the edges.

Outputting the graph as described above allows the manager to check that the confidentiality levels are set for the different tables and columns in a chain reaction with the origin column being the origin.

Furthermore, the database management apparatus 701 according to an embodiment of the present disclosure receives the access request to the column in one of the multiple databases from the data access apparatus 752, and transmits the data depending on the confidentiality level of the column indicated by the received access request to the data access apparatus 752.

Performing access control depending on the confidentiality level set for each column in each database in response to the access request from the user as described above enables appropriate access control for each user even when pieces of confidential data are present in many databases.

The present disclosure is not limited to the aforementioned embodiment, and can be carried out by using any components within the scope not departing from the spirit of the present disclosure. The embodiment and modified examples described above are merely examples, and the present disclosure is not limited to the aforementioned contents as long as the characteristics of the disclosure are not impaired. Moreover, although various embodiment and modified examples are described above, the present disclosure is not limited to the contents of these embodiment and modified examples. Other modes conceivable within the scope of technical idea of the present disclosure are also included in the scope of the present disclosure.

For example, some pieces of hardware included in each apparatus according to an embodiment of the present disclosure may be provided in another apparatus.

Moreover, each of the programs in each apparatus may be provided in another apparatus. A certain program may be formed of multiple programs, or multiple programs may be integrated into one program.

What is claimed is:

1. A database management apparatus comprising:
a storage device configured to store a plurality of databases each including one or more columns; and
a processing device configured to:
receive a specification of one of the columns in the databases as an origin column, the origin column having a name,
select a first column in a different database other than a database related to the specified origin column that has the same name as the origin column,
calculate a confidentiality level of the selected first column in the different database other than the database related to the specified origin column based on a confidentiality level of the origin column and a degree of similarity between contents of data stored in the specified origin column and contents of data stored in the selected first column in the different database,
calculate a confidentiality level of the different database based on the calculated confidentiality level and a value indicating identifiability of the data in the selected first column in the different database, and
calculate a confidentiality level of a selected second column in the different database based on the calculated confidentiality level of the different database and a value indicating identifiability of data in the selected second column, set the selected second column as the new origin column, and set the calculated confidentiality level as a confidentiality level of the new origin column.

2. The database management apparatus according to claim 1,
wherein the processing device calculates the degree of similarity based on a degree of similarity between distribution of pieces of the data stored in the origin column and distribution of pieces of the data stored in the selected first column in the different database.

3. The database management apparatus according to claim 1,
wherein the processing device calculates the degree of similarity based on a degree of commonality between values of pieces of the data stored in the origin column and values of pieces of the data stored in the selected first column in the different database.

4. The database management apparatus according to claim 1,
wherein the storage device stores a calculation method for the confidentiality level of the selected first column in the different database, and the processing device calculates the confidentiality level of the selected first column in the different database according to the stored calculation method.

5. The database management apparatus according to claim 1,
wherein the storage device stores a calculation method for the confidentiality level of the different database, and the processing device calculates the confidentiality level of the different database according to the stored calculation method.

6. The database management apparatus according to claim 1,
wherein the storage device stores a calculation method for the confidentiality level of the selected column, and the processing device calculates the confidentiality level of the selected column according to the stored calculation method.

7. The database management apparatus according to claim 1,
wherein the processing device outputs a graph in which the confidentiality level of the origin column, the confidentiality level of the selected first column in the different database, the confidentiality level of the different database, and the confidentiality level of the selected second column in the different database are expressed respectively as nodes, a degree of similarity that is a calculation basis of the selected first column in the different database, the value indicating identifiability of the different database, and the value indicating identifiability of the selected first column in the different database are expressed respectively as edges, and figures indicating the nodes are coupled to one another by figures indicating the edges.

8. The database management apparatus according to claim 1,
wherein the processing device receives an access request to a column in one of the plurality of databases from an information processing apparatus, and transmits data depending on the confidentiality level of the column indicated by the received access request to the information processing apparatus.

9. A database management method implemented by an information processing apparatus, comprising:
storing a plurality of databases each including one or more columns;
receiving a specification of one of the columns in the databases as an origin column, the origin column having a name;
selecting a first column in a different database other than a database related to the specified origin column that has the same name as the origin column;
calculating a confidentiality level of the selected first column in the different database other than the database a database-related to the specified origin column based on a confidentiality level of the origin column and a degree of similarity between contents of data stored in the specified origin column and contents of data stored in the selected first column in the different database;
calculating a confidentiality level of the different database based on the calculated confidentiality level and a value indicating identifiability of the data in the selected first column in the different database; and
calculating a confidentiality level of a selected second column in the different database based on the calculated confidentiality level of the different database and a value indicating identifiability of data in the selected second column, setting the selected second column as the new origin column, and setting the calculated confidentiality level as a confidentiality level of the new origin column.

* * * * *